US012482483B2

United States Patent
Cui et al.

(10) Patent No.: US 12,482,483 B2
(45) Date of Patent: Nov. 25, 2025

(54) LENGTH PERTURBATION TECHNIQUES FOR IMPROVING GENERALIZATION OF DEEP NEURAL NETWORK ACOUSTIC MODELS

(71) Applicant: International Business Machines Corporation, Armonk, NY (US)

(72) Inventors: Xiaodong Cui, Chappaqua, NY (US); Brian E. D. Kingsbury, Cortlandt Manor, NY (US); George Andrei Saon, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 18/057,967

(22) Filed: Nov. 22, 2022

(65) Prior Publication Data

US 2024/0170005 A1    May 23, 2024

(51) Int. Cl.
*G10L 21/04*    (2013.01)

(52) U.S. Cl.
CPC .................................. *G10L 21/04* (2013.01)

(58) Field of Classification Search
CPC ........ G10L 21/04; G10L 15/063; G10L 15/06
See application file for complete search history.

(56) References Cited

U.S. PATENT DOCUMENTS

| | | | |
|---|---|---|---|
| 9,715,870 B2 | 7/2017 | Hwang et al. | |
| 10,930,268 B2 | 2/2021 | Yoo et al. | |

(Continued)

FOREIGN PATENT DOCUMENTS

| | | |
|---|---|---|
| CN | 109767782 A | 5/2019 |
| CN | 109767782 B | 4/2020 |

(Continued)

OTHER PUBLICATIONS

Huang, Sh. et al. | "Context-Aware Selective Label Smoothing for Calibrating Sequence Recognition Model." MM '21, Oct. 20-24, 2021, Virtual Event, China, 9 pages.

(Continued)

*Primary Examiner* — Huyen X Vo
(74) *Attorney, Agent, or Firm* — Amin, Turocy & Watson, LLP

(57) ABSTRACT

One or more systems, devices, computer program products and/or computer-implemented methods of use provided herein relate to length perturbation techniques for improving generalization of DNN acoustic models. A computer-implemented system can comprise a memory that can store computer executable components. The computer-implemented system can further comprise a processor that can execute the computer executable components stored in the memory, wherein the computer executable components can comprise a frame skipping component that can remove one or more frames from an acoustic utterance via frame skipping. The computer executable components can further comprise a frame insertion component that can insert one or more replacement frames into the acoustic utterance via frame insertion to replace the one or more frames with the one or more replacement frames to enable length perturbation of the acoustic utterance.

20 Claims, 8 Drawing Sheets

(56) References Cited

U.S. PATENT DOCUMENTS

| | | | |
|---|---|---|---|
| 11,227,579 | B2 | 1/2022 | Nagano et al. |
| 2010/0023315 | A1 | 1/2010 | Quirk |
| 2014/0146695 | A1* | 5/2014 | Kim .................. H04L 65/80 370/252 |
| 2014/0210652 | A1 | 7/2014 | Bartnik et al. |
| 2017/0040016 | A1 | 2/2017 | Cui et al. |
| 2017/0040022 | A1* | 2/2017 | Sung ................. G10L 19/022 |
| 2017/0103740 | A1 | 4/2017 | Hwang et al. |
| 2018/0234721 | A1* | 8/2018 | Yang ................. H04N 21/439 |
| 2019/0371301 | A1 | 12/2019 | Yoo et al. |
| 2020/0027444 | A1 | 1/2020 | Prabhavalkar et al. |
| 2020/0175335 | A1 | 6/2020 | Li et al. |
| 2020/0243102 | A1* | 7/2020 | Schmidt ............. G10L 19/02 |
| 2021/0043186 | A1 | 2/2021 | Nagano et al. |
| 2021/0141995 | A1 | 5/2021 | Lundgaard et al. |
| 2021/0350238 | A1 | 11/2021 | Lei |
| 2022/0108220 | A1 | 4/2022 | Qin et al. |
| 2023/0107741 | A1 | 4/2023 | Saraf et al. |
| 2023/0230602 | A1* | 7/2023 | Mariager ........... G10L 19/005 704/203 |

FOREIGN PATENT DOCUMENTS

| | | |
|---|---|---|
| CN | 114154519 A | 3/2022 |
| CN | 114154519 B | 4/2022 |
| WO | 2021217619 A1 | 4/2021 |

OTHER PUBLICATIONS

Cui, X. et al. | "Improving Generalization of Deep Neural Network Acoustic Models with Length Perturbation and N-best Based Label Smoothing." arXiv:2203.15176v1 [cs.CL] Mar. 29, 2022, 5 pages.

Gong et al. | "MaxUp: A Simple Way to Improve Generalization of Neural Network Training." arXiv:2002.09024v1 [cs.LG] Feb. 20, 2020, 10 pages.

Zhang, X. et al. | "Improving Deep Neural Network Acoustic Models Using Generalized Maxout Networks." Center for Language and Speech Processing & Human Language Technology Center of Excellence, The Johns Hopkins University, Baltimore, MD 21218, USA, 2020, 5 pages.

Zheng, Y. et al. | "Regularizing Neural Networks via Adversarial Model Perturbation." CVPR 2021, public version of IEEE Xplore publication, published 2021, 10 pages.

ip.com | "Uncertainty Modeling for Neural-Network-Based Speaker Comparison." Disclosed Anonymously, IP.com No. IPCOM000270265D, IP.com Electronic Publication Date: Jun. 22, 2022, 4 pages.

ip.com | "Deep Learning, Linguistic Processing and Dynamic Optimization based Revision Recommendation for optimum learning Path." Disclosed Anonymously, IP.com No. IPCOM000267766D, IP.com Electronic Publication Date: Nov. 22, 2021, 13 pages.

ip.com | "Class Identification in Deep-Learning Models." Disclosed Anonymously, IP.com No. PCOM000265288D, IP.com Electronic Publication Date: Mar. 23, 2021, 10 pages.

Jain et al., "Spliceout: A Simple and Efficient Audio Augmentation Method", Oct. 13, 2021, 25 pages.

Sunder et al., "Towards End-to-End Integration of Dialog History for Improved Spoken Language Understanding", Apr. 11, 2022, 05 pages.

Serai et al., "Improving Speech Recognition Error Prediction for Modern and Off-The-Shelf Speech Recognizers", IEEE, May 2019, 12 pages.

United States Non-Final Rejection dated Aug. 25, 2025, 13 pages in U.S. Appl. No. 18/057,983.

* cited by examiner

LENGTH PERTURBATION TECHNIQUES FOR IMPROVING GENERALIZATION OF DEEP NEURAL NETWORK ACOUSTIC MODELS

BACKGROUND

The subject disclosure relates to machine learning and, more specifically, to length perturbation techniques for improving generalization of deep neural network (DNN) acoustic models.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable length perturbation techniques for improving generalization of DNN acoustic models are discussed.

According to an embodiment, a computer-implemented system is provided. The computer-implemented system can comprise a memory that can store computer executable components. The computer-implemented system can further comprise a processor that can execute the computer executable components stored in the memory, wherein the computer executable components can comprise a frame skipping component that can remove one or more frames from an acoustic utterance via frame skipping. The computer executable components can further comprise a frame insertion component that can insert one or more replacement frames into the acoustic utterance via frame insertion to replace the one or more frames with the one or more replacement frames to enable length perturbation of the acoustic utterance.

According to another embodiment, a computer-implemented method is provided. The computer-implemented method can comprise removing, by a system operatively coupled to a processor, one or more frames from an acoustic utterance via frame skipping. The computer-implemented method can further comprise inserting, by the system, one or more replacement frames into the acoustic utterance via frame insertion to replace the one or more frames with the one or more replacement frames to enable length perturbation of the acoustic utterance.

According to yet another embodiment, a computer program product for improving generalization of a DNN acoustic model is provided. The computer program product can comprise a computer readable storage medium having program instructions embodied therewith, the program instructions executable by a processor to cause the processor to remove, by the processor, one or more frames from an acoustic utterance via frame skipping. The program instructions are further executable by the processor to cause the processor to insert, by the processor, one or more replacement frames into the acoustic utterance via frame insertion to replace the one or more frames with the one or more replacement frames to enable length perturbation of the acoustic utterance.

DETAILED DESCRIPTION

Figure 1:
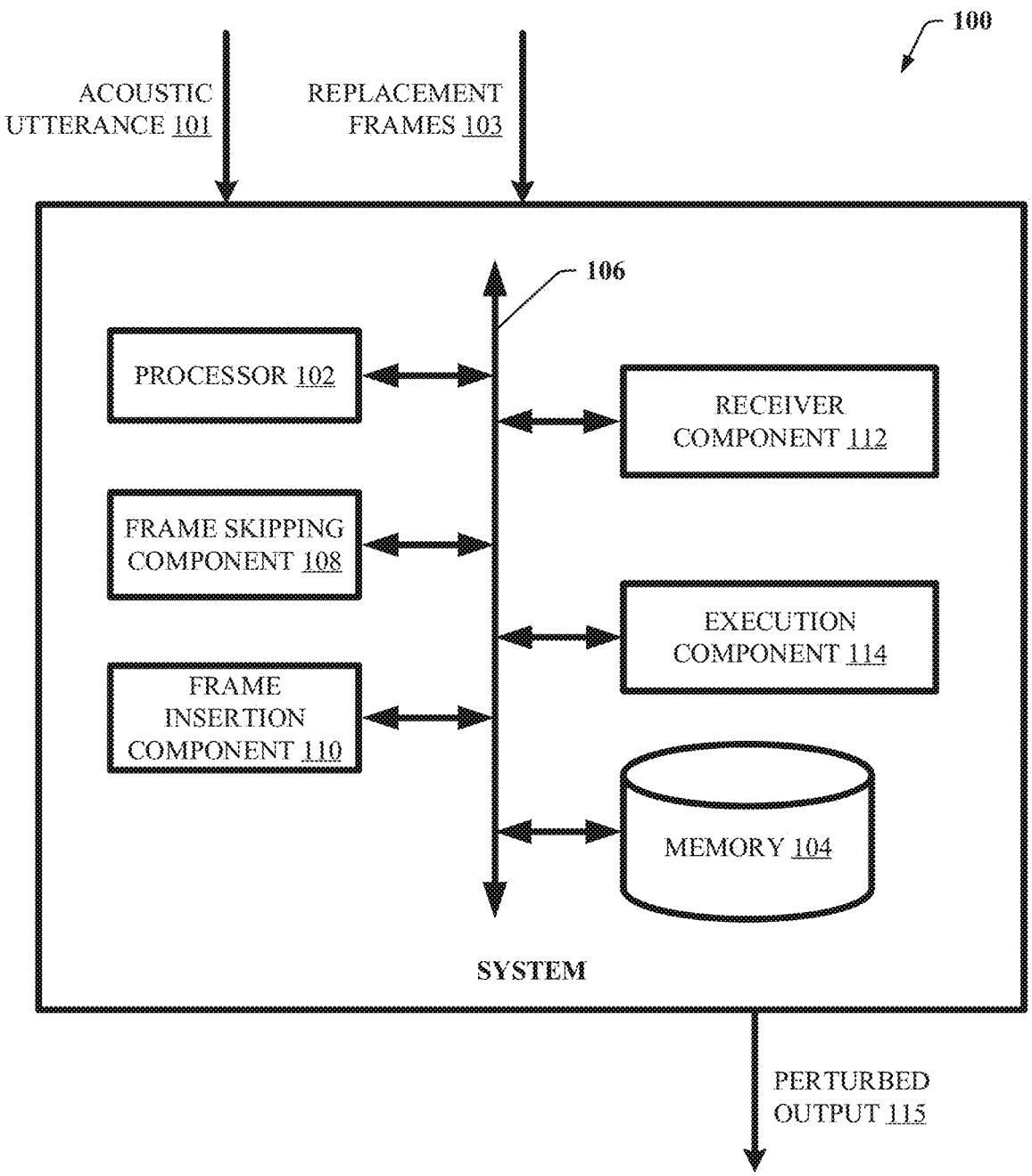
FIG. 1 illustrates a block diagram of an example, non-limiting system that enables length perturbation techniques for improving generalization of DNN acoustic models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Generalization can be a source of fundamental problems in machine learning (ML), wherein generalization can refer to an ML model's ability to adapt to new data. In automatic speech recognition (ASR), acoustic models with DNN architectures can suffer from overfitting due to a huge number of their parameters, wherein overfitting can refer to a phenomenon wherein an ML model can learn training data too well and to an extent that the ML model's performance on new data is negatively impacted. To make DNN models generalize well, techniques such as model regularization (e.g., $l_1$-norm or $l_2$-norm regularization, dropout, etc.) and data augmentation can be broadly used in training. Data augmentation techniques can help a system to be more robust and generalize better.

Described herein are one or more embodiments of a computer-implemented system, computer-implemented method and/or computer program product for improving generalization of DNN acoustic models for ASR via length perturbation. Length perturbation can comprise a data augmentation algorithm that can randomly drop and insert frames of an utterance to alter the length of a speech feature sequence. Length perturbation can compress and stretch the feature sequence of an utterance in training to provide a perturbed variant of the utterance having a different length. This can be conducted by using both frame skipping and frame insertion.

Frame skipping and frame insertion techniques as separate approaches can be used for different purposes. Frames can be skipped in ASR systems, in a fixed or dynamic manner, for reduced processing time in training or decoding. SpliceOut can be proposed to treat frame skipping as a time masking approach to improve generalization of DNN models in various speech recognition and audio classification tasks. Further, DropFrame, despite being aimed at reducing training time, can also help to improve performance of end-to-end models. Analogously, frame insertion or time stretching can be used as a perturbation technique for speech and audio signals in the other directions. From the length perturbation perspective, the one or more embodiments and/or applications of embodiments discussed herein of either frame skipping or frame insertion can tend to perturb the length of an utterance towards one direction. The length perturbation approach investigated in the one or more embodiments discussed herein can comprise perturbation both ways.

Length perturbation can help in scenarios where there is a mismatch in the length of utterances between training and test conditions. In addition, by randomly dropping frames, length perturbation can also perturb a memory of a sequence model such as, for example, a long short-term memory (LSTM) network to prevent the sequence model from simply memorizing the history of a feature sequence in the training. Neural networks such as, for example, LSTM can accumulate a memory from previous frames to the current frames, thereby developing a strong memory in terms of the history. Frame skipping can effectively perturb an observation history. By randomly dropping frames the history can be perturbed such that a model (e.g., LSTM model, etc.) can memorize a perturbed history, which can help the model to generalize better in test conditions.

Further, the applied frame insertion can be viewed as simulating a SpecAugment (SpecAug) mechanism for an utterance of longer length (e.g., FIG. 2C), and it can encourage a system (e.g., an ML system) to fill in the inserted frames during training, which can also be similar in spirit to a filling in frames (FIF) idea in voice conversion. For example, by inserting some frames the system can be forced to learn how to fill in frames (e.g., non-existent frames), such that a user-defined loss function can be best optimized. SpecAug is a data augmentation technique used in the speech community and the proposed length perturbation can be additive/complimentary to this technique.

The configuration of a DNN can be called an LSTM, wherein the LSTM is a sequence model used for speech recognition or other sequence-to-sequence mapping tasks (e.g., machine translation). For example, any sequence-to-sequence mapping task can use the length perturbation techniques described herein to generalize better. Therefore, length perturbation can improve generalization of a model (e.g., a DNN acoustic model). Length perturbation can improve the generalization of recurrent neural network transducer (RNNT) acoustic models individually and in combination with an n-best based label smoothing technique, wherein the n-best based label smoothing technique can comprise randomly injecting noisy labels to ground truth labels during training. Length perturbation can individually improve word error rates (WERs) on different datasets discussed in one or more embodiments herein. The length perturbation and n-best based label smoothing techniques can also be implemented as complimentary techniques to obtain state-of-the-art WERs on the different datasets.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 700 illustrated at FIG. 7. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that enables length perturbation techniques for improving generalization of DNN acoustic models in accordance with one or more embodiments described herein. Non-limiting system 100 can comprise processor 102, memory 104, system bus 106, frame skipping component 108, frame insertion component 110, receiver component 112, and execution component 114.

Discussion first turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 (e.g., frame skipping component 108, frame insertion component 110, receiver component 112, and/or execution component 114) to perform one or more actions. In one or more embodiments, memory 104 can store computer-executable components (e.g., frame skipping component 108, frame insertion component 110, receiver component 112, and/or execution component 114).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction (s). System 100 can be associated with, such as accessible via, a computing environment 700 described below with reference to FIG. 7. For example, system 100 can be associated with a computing environment 700 such that aspects of processing can be distributed between system 100 and the computing environment 700.

In one or more embodiments, system 100 can enable length perturbation techniques for improving generalization of DNN acoustic models for ASR. System 100 can enable length perturbation of an acoustic utterance using frame skipping and/or frame insertion techniques. For example, receiver component 112 can receive an acoustic utterance (e.g., acoustic utterance 101), and frame skipping component 108 can remove one or more frames from the acoustic utterance via frame skipping. For example, frame insertion component 110 can insert one or more replacement frames (e.g., replacement frames 103) into the acoustic utterance (e.g., acoustic utterance 101) via frame insertion to replace the one or more frames with the one or more replacement frames to enable length perturbation of the acoustic utterance.

In an embodiment, the length perturbation of acoustic utterance 101 can be a one-way perturbation enabled by at least one of the frame skipping or the frame insertion. For example, a length of acoustic utterance 101 can be perturbed by applying only a frame skipping technique. For example, the length of acoustic utterance 101 can be perturbed by applying only a frame insertion technique. In another embodiment, the length perturbation of acoustic utterance 101 can be a two-way perturbation enabled by both the frame skipping and the frame insertion. In an embodiment, execution component 114 can apply the length perturbation of the acoustic utterance (e.g., acoustic utterance 101) as an individual data augmentation technique. In another embodiment, execution component 114 can apply the length perturbation of the acoustic utterance (e.g., acoustic utterance 101) as a first data augmentation technique in combination with at least a second data augmentation technique. Further, the length perturbation techniques discussed herein can be implemented with another technique such as a regularization technique. For example, execution component 114 can implement length perturbation of the acoustic utterance in combination with an n-best based label smoothing technique to improve generalization of a DNN acoustic model, as discussed in one or more embodiments herein.

Further, in one or more embodiments, the length perturbation of the acoustic utterance can be applied to one or more domains of feature representations (e.g., LogMel, Spectrogram, etc.) and to a broad variety of DNN acoustic models (e.g., LSTM, conformer, etc.). In one or more embodiments, the frame skipping and the frame insertion can be applied towards length perturbation using one or more sequence-to-sequence models, to assist with generalization of the one or more sequence-to-sequence models. For example, the frame skipping and frame insertion can be applied to various sequence-to-sequence mapping problems that are not speech specific. In one or more embodiments, the frame skipping and the frame insertion can be applied towards length perturbation using one or more sequence-to-one models, to assist with generalization of the one or more sequence-to-one models. For example, the frame skipping and frame insertion can be applied to various sequence-to-one mapping problems (e.g., image classification) wherein the input to an ML model can comprise a sequence but the output of the ML model can be a non-sequence (e.g., an image).

Figure 2A:
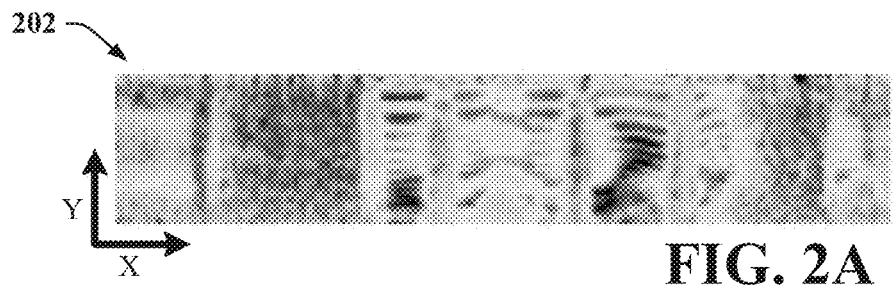
FIG. 2A illustrates an example, non-limiting spectrum of an utterance in accordance with one or more embodiments described herein.
Figure 2B:
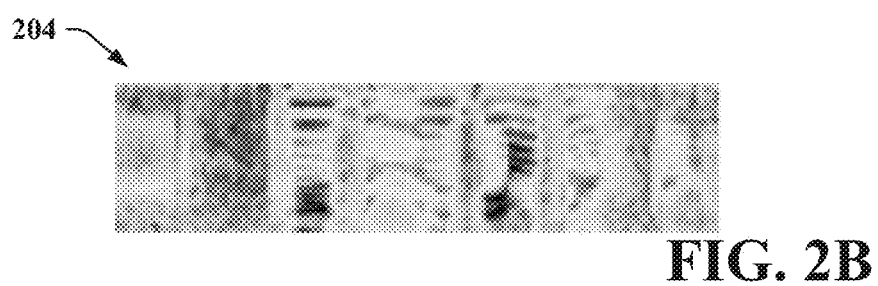
FIG. 2B illustrates another example, non-limiting spectrum of an utterance in accordance with one or more embodiments described herein.
Figure 2C:
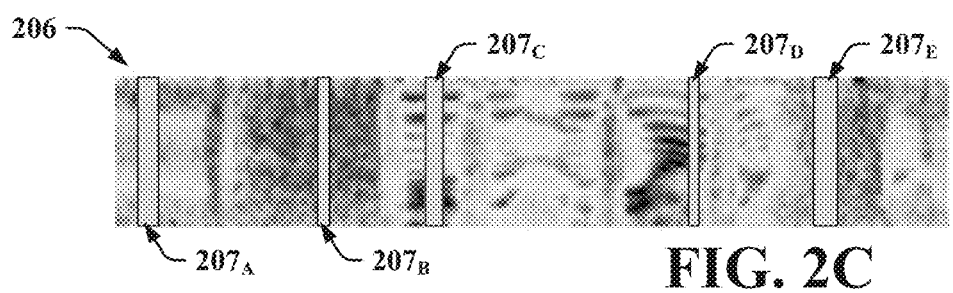
FIG. 2C illustrates yet another example, non-limiting spectrum of an utterance in accordance with one or more embodiments described herein.
Figure 2D:
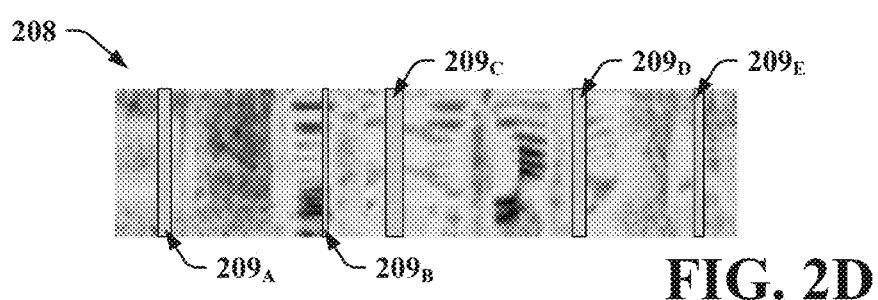
FIG. 2D illustrates yet another example, non-limiting spectrum of an utterance in accordance with one or more embodiments described herein.

FIG. 2A illustrates an example, non-limiting spectrum (e.g., logMel spectrum 202) of an utterance in accordance with one or more embodiments described herein. FIG. 2B illustrates another example, non-limiting spectrum (e.g., logMel spectrum 204) of an utterance in accordance with one or more embodiments described herein. FIG. 2C illustrates yet another example, non-limiting spectrum (e.g., logMel spectrum 206) of an utterance in accordance with one or more embodiments described herein. FIG. 2D illustrates yet another example, non-limiting spectrum (e.g., logMel spectrum 208) of an utterance in accordance with one or more embodiments described herein. Repetitive description of like elements and/or processes employed in respective embodiments is omitted for sake of brevity.

Figure 2E:
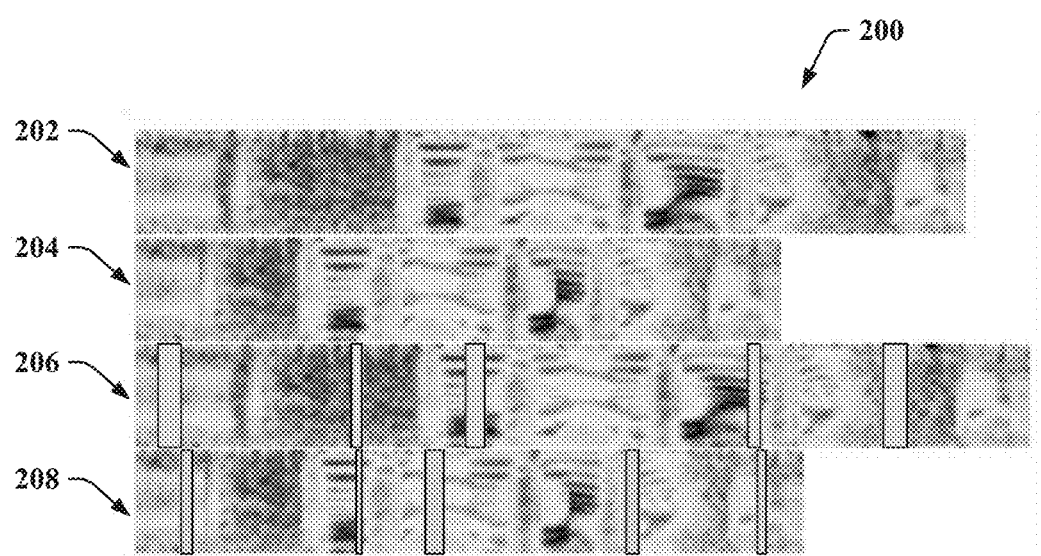
FIG. 2E illustrates the example, non-limiting spectra of FIGS. 2A-2D in accordance with one or more embodiments described herein.

The length of an utterance (e.g., acoustic utterance 101) can be perturbed first by skipping frames and then followed by inserting frames, both with a probability. To skip frames, $r_s$ percentage of frames can be randomly sampled from the utterance (e.g., acoustic utterance 101) to operate on. For each sampled frame x, $t_s$ consecutive frames can be dropped starting from x where $t_s$ can be an integer upper bounded by a hyper-parameter $T_s$. Analogously, to insert frames, $r_p$ percentage of frames can be randomly sampled from the utterance (e.g., acoustic utterance 101) to operate on. For each sampled frame y, $t_p$ consecutive blank frames (zero vectors) can be inserted after y where $t_p$ can be an integer upper bounded by a hyper-parameter $T_p$. This can be further illustrated by FIGS. 2A-2D. FIG. 2E illustrates the example, non-limiting spectra of FIGS. 2A-2D in accordance with one or more embodiments described herein. FIG. 2E illustrates the logMel spectra 202, 204, 206 and 208 of FIGS. 2A-2D as a collective set of images 200.

In FIG. 2A, logMel spectrum 202 of an utterance (e.g., acoustic utterance 101) is demonstrated. FIG. 2B and FIG. 2C illustrate the respective perturbed versions, logMel spectrum 204 and logMel spectrum 206, of logMel spectrum 202. LogMel spectrum 204 and logMel spectrum 206 can be generated by frame skipping and frame insertion, respectively. For example, one or more frames (not shown) can be removed from an utterance (e.g., acoustic utterance 101) to generate an utterance of perturbed length, as illustrated by logMel spectrum 204, and frames $207_A$, $207_B$, $207_C$, $207_D$ and $207_E$ can be inserted into an utterance (e.g., acoustic utterance 101) to generate another utterance of perturbed length, as illustrated by logMel spectrum 206. FIG. 2D illustrates the overall effect of perturbation after both frame skipping and frame insertion. For example, logMel spectrum 208 can represent an utterance generated by frame skipping followed by frame insertion, wherein frames $209_A$, $209_B$, $209_C$, $209_D$ and $209_E$ can be inserted. All three perturbations (e.g., logMel spectrum 204, logMel spectrum 206, logMel spectrum 208) can be carried out with certain probabilities according to Algorithm 1. Algorithm 1 can describe an implementation of the one or more length perturbation techniques discussed herein.

---

Algorithm 1: Length perturbation of input utterances

---

L ← Total number of utterances
$p_s$ ← Probability of perturbation by dropping frames;
$r_s$ ← Percentage of frames to be perturbed in an utterance;
$T_s$ ← Maximum frames to drop;
$p_p$ ← Probability of perturbation by inserting frames;
$r_p$ ← Percentage of frames to be perturbed in an utterance;
$T_p$ ← Maximum frames to insert;
for 1 < 1,..., L do
    Perturb this utterance by dropping frames with prob. $p_s$:
        DropFrames($r_s$, $T_s$)
    Perturb this utterance by inserting frames with prob. $p_p$:
        InsertFrames($r_p$, $T_p$)
function DROPFRAMES($r_s$, $T_s$)
    Sample $r_s$ percentage of frames from the utterance
    for each sampled frame x do
        Randomly generate an integer $t_s \in [1; T_s]$
        Drop $t_s$ consecutive frames starting from x
function INSERTFRAMES($r_p$, $T_p$)
    Sample $r_p$ percentage of frames from the utterance
    for each sampled frame y do
        Randomly generate an integer $t_p \in [1; T_p]$
        Insert $t_p$ consecutive blank frames after y

---

FIG. 2A further illustrates a coordinate system towards the bottom left side of FIG. 2A, wherein the X-axis can be a time axis and the Y-axis can represent a spectrum in the frequency domain. The coordinate system illustrated in FIG. 2A can be applied to FIGS. 2B-2D. It is to be appreciated that the coordinate system illustrated in FIG. 2A is for exemplary purposes only. FIGS. 2A-2D illustrate sequences of feature vectors to represent a speech. For frame skipping, a number of locations can be randomly selected along a sequence of feature vectors to drop frames (e.g., frame skipping) at the randomly selected locations, and similarly, a number of locations can be randomly selected along the sequence of feature vectors to insert frames (e.g., frame insertion) at the randomly selected locations. Frame skipping can generate a shorter utterance (e.g., FIG. 2B), and frame insertion can generate an utterance of longer length (e.g., FIG. 2C). Both the frame skipping and frame insertion can be executed in combination (e.g., FIG. 2D). For example, out of frames 1-15 generated for an acoustic utterance (e.g., acoustic utterance 101), frames 12 and 13 can be skipped along the X-axis (e.g., time axis), thereby resulting in a sequence wherein frame 14 appears directly after frame 11. A similar idea can be applied to frame insertion (e.g., frames $207_A$, $207_B$, $207_C$, $207_D$ and $207_E$). In regard to frame insertion, zero vectors or vectors with some noise can be inserted to the sequence of feature vectors, wherein the zero vector and/or noisy vectors can represent hyper-parameters.

With continued reference to FIGS. 2A-2D, Tables 1, 2 and 3 can demonstrate the efficacy of the length perturbation techniques discussed in one or more embodiments herein. The length perturbation technique was evaluated on a 300-hour Switchboard (SWB300) dataset, a 2000-hour Switchboard (SWB2000) dataset and an in-house 500-hour Japanese (JPN500) dataset using RNNT acoustic models for ASR. ASR experiments were carried out on the SWB300 dataset which consists of narrowband speech, the SWB2000 dataset and the JPN500 dataset which consists of broadband speech to evaluate the length perturbation technique with various configurations. The acoustic models were RNNTs. The SWB300 dataset comprises speech data (e.g., people talking over a telephone line), and the size of the training dataset comprises 300 hours of spontaneous speech. Experiments on the SWB300 can show that length perturbation can help in real world applications.

The RNNT acoustic model for SWB300 can have 6 bi-directional LSTM layers (6-layer bi-directional LSTM) in the transcription network with 1,280 cells in each layer (640 cells in each direction). The prediction network can be a single-layer uni-directional LSTM with 768 cells. The outputs of the transcription network and the prediction network were projected down to a 256-dimensional latent space where they were combined by element-wise multiplication in the joint network. After a hyperbolic tangent nonlinearity followed by a linear transform, it can connect to a softmax layer consisting of 46 output units corresponding to 45 characters and the null symbol (45+1 symbols). The acoustic features can be 40-dimensional logMel features extracted every 10 ms and their first and second order derivatives. The logMel features were after conversation based mean and variance normalization. Every two adjacent frames were concatenated and appended by a 100-dimensional i-vector as speaker embedding. Therefore, the input to the transcription network can be 340 in dimensionality (340-dim vector). The text input can be 45 characters with a 10-dimensional embedding.

The training data can go through three steps of data augmentation. First, it can be augmented by speed and tempo perturbation. This can be conducted offline and produces additional four replicas of the original training data, which can give rise to about 1,500 hours of training data in total. After the speed and tempo perturbation, mix-up sequence noise can be injected where an utterance can be artificially corrupted by adding a randomly selected down-scaled training utterance from the training set. Thereafter, SpecAug (SpecAugment) can be applied where the logMel spectrum of a training utterance can be randomly masked in blocks in both the time and frequency domains. Dropout can also be used in the LSTM layers with a dropout rate of 0.25 and in the embedding layer with a dropout rate of 0.05. In addition, DropConnect can be applied with a rate of 0.25, which randomly zeros out elements of LSTM hidden-to-hidden transition matrices. A Connectionist Temporal Classification (CTC) model can be used to initialize the transcription network. CTC is a sequence-based criteria wherein, instead of randomly initializing a model (e.g., randomly initializing a weight of a neural network), the model can be initialized with a well-trained model to begin the training in a better position. That is, using CTC initialization, a first model can be trained using a first loss function to obtain a well-trained model and the well-trained model can be used to initialize the model to be used for the training.

Optimizer AdamW was used for the training. The learning rate can start at 0.0001 in the first epoch and then linearly scale up to 0.001 in the first 10 epochs. That is, the learning rate schedule can comprise a target learning rate of 0.001 with a linear warmup starting from 0.0001 for 10 epochs. It can hold for another 6 epochs before being annealed by $1/\sqrt{2}$ (0.707) every epoch after the 16th epoch. The training can end after 30 epochs (e.g., the training can end at $\$_{30}th\$$ epoch). The batch size can be 64 utterances. An alignment-length synchronous decoder was used for inference. The WERs were measured with and without an external language model (LM). When decoding with an external LM, density ratio LM fusion was used. The external LM was trained on a target domain corpus (Fisher (fsh) and Switchboard (swb)) and the source LM was trained only on the training transcripts. The length perturbation was applied before mix-up and SpecAug, all of which was carried out on the fly in the data loader. Various hyper-parameter configurations were evaluated for length perturbation ($p_s$, $p_p$, $r_s$, $r_p$, $T_s$, $T_p$) on Hub5 2000 (Hub5'00), Hub5 2001 (Hub5'01) and RT03 (RT'03) test sets. The data preparation pipeline followed a Kaldi s5c recipe.

Table 1 breaks down the performance of length perturbation on frame insertion (rows 4-7), frame skipping (rows 8-11) and perturbation both ways (rows 12-14), respectively, on the Hub5 2000 test set. Row 1 represents baseline results obtained for the WER without using the length perturbation techniques. Column 1 lists configuration values, wherein $p_s$ can represent a probability of perturbation by dropping frames, $r_s$ can represent a percentage of frames to be perturbed in an utterance, $T_s$ can represent maximum frames to drop, $p_p$ can represent a probability of perturbation by inserting frames, $r_p$ can represent a percentage of frames to be perturbed in an utterance, and $T_p$ can represent maximum frames to insert. Columns 2-4 list the results of decoding without using an external LM, and columns 5-7 list the results of decoding when an external LM is used. Usually, using an LM model can result in better performance. The length perturbation was applied in the first 25 epochs and lifted afterwards. From the table, it can be observed that both frame insertion and skipping alone can improve WERs. The best WER was obtained when perturbing both ways (average 10.7% without using external LM (w/o LM) and 9.4% when using external LM (w/LM)). Both, one-way length perturbation (via frame skipping or frame insertion) and two-way length perturbation (via both frame skipping and frame insertion) can be implemented, as discussed in one or more embodiments herein.

wise multiplication in the joint network. After a hyperbolic tangent nonlinearity followed by a linear transform, it can connect to a softmax layer consisting of 43 output units corresponding to 42 characters and the null symbol (42+1 symbols). The acoustic features can be 40-dimensional logMel features extracted every 10 ms and their first and second order derivatives. The logMel features were after conversation based mean and variance normalization. Every two adjacent frames were concatenated and appended by a 100-dimensional i-vector as speaker embedding. Therefore, the input (acoustic input) to the transcription network can be 240 in dimensionality (240-dim vector). The text input can be 42 characters with a 10-dimensional embedding.

The training data can go through three steps of data augmentation. First, it can be augmented by speed and tempo perturbation. This can be conducted offline and produces additional four replicas of the original training data, which can give rise to about 1,500 hours of training data in total. After the speed and tempo perturbation, mix-up sequence noise can be injected where an utterance can be artificially corrupted by adding a randomly selected downscaled training utterance from the training set. Thereafter, SpecAug (SpecAugment) can be applied where the logMel spectrum of a training utterance can be randomly masked in blocks in both the time and frequency domains. Dropout can also be used in the LSTM layers with a dropout rate of 0.25 and in the embedding layer with a dropout rate of 0.05. In addition, DropConnect can be applied with a rate of 0.25, which randomly zeros out elements of the LSTM hidden-to-hidden transition matrices.

Optimizer AdamW was used for the training. Herein, the learning rate schedule and the number of epochs were different in comparison to the experiments involving the SWB300 dataset. The maximum learning rate was set to

TABLE 1

Length perturbation using various hyper-parameter configurations on SWB300.

| | w/o LM | | | w/LM | | |
|---|---|---|---|---|---|---|
| | swb | ch | avg | swb | ch | avg |
| baseline | 7.4 | 15.0 | 11.2 | 6.1 | 13.5 | 9.8 |
| $p_p = 0.6, r_p = 0.05, T_p = 5$ | 7.1 | 15.1 | 11.1 | 6.0 | 13.3 | 9.7 |
| $p_p = 0.6, r_p = 0.1, T_p = 3$ | 7.2 | 14.9 | 11.1 | 6.1 | 13.1 | 9.6 |
| $p_p = 0.6, r_p = 0.1, T_p = 7$ | 7.1 | 14.9 | 11.0 | 6.1 | 13.3 | 9.7 |
| $p_p = 0.7, r_p = 0.1, T_p = 5$ | 7.3 | 14.7 | 11.0 | 6.1 | 13.3 | 9.7 |
| $p_s = 0.7, r_s = 0.1, T_s = 5$ | 7.0 | 14.8 | 10.9 | 6.0 | 13.4 | 9.7 |
| $p_s = 0.7, r_s = 0.1, T_s = 7$ | 6.9 | 14.5 | 10.7 | 5.9 | 13.0 | 9.5 |
| $p_s = 0.8, r_s = 0.1, T_s = 7$ | 6.8 | 14.8 | 10.8 | 5.8 | 13.0 | 9.4 |
| $p_s = 0.7, r_s = 0.1, T_s = 9$ | 6.9 | 14.8 | 10.9 | 6.0 | 13.1 | 9.6 |
| $p_s = p_p = 0.6, r_s = r_p = 0.1, T_s = 7, T_p = 3$ | 7.1 | 14.7 | 10.9 | 6.1 | 13.2 | 9.7 |
| $p_s = p_p = 0.7, r_s = r_p = 0.1, T_s = 7, T_p = 3$ | 6.9 | 14.4 | 10.7 | 5.9 | 12.8 | 9.4 |
| $p_s = p_p = 0.8, r_s = r_p = 0.1, T_s = 7, T_p = 3$ | 7.0 | 14.5 | 10.8 | 5.9 | 13.0 | 9.5 |

The RNNT acoustic model for SWB2000 can have 10 conformer blocks in the transcription network (512 cells, 8 heads). The SWB2000 is a superset of the SWB300 dataset and comprises 2000 hours of speech data. The SWB2000 can result in better model performance. The prediction network can be a single-layer uni-directional LSTM with 1024 cells. The outputs of the transcription network and the prediction network were projected down to a 256-dimensional latent space where they were combined by element- 5e-4 and a OneCycleLR policy was used for 30 epochs. The batch size can be 128 utterances. An alignment-length synchronous decoder was used for inference. No external LM was used. The length perturbation was applied before mix-up and SpecAug, all of which was carried out on the fly in the data loader. Various hyper-parameter configurations were evaluated for length perturbation ($p_s$, $p_p$, $r_s$, $r_p$, $T_s$, $T_p$) on Hub5 2000, Hub5 2001 and RT03 test sets. The data preparation pipeline followed Kaldi s5c recipe.

TABLE 2 lists the experimental results with the SWB2000 dataset.

|  | Hub5'00 | | | Hub5'01 | | | | RT'03 | | |
| --- | --- | --- | --- | --- | --- | --- | --- | --- | --- | --- |
|  | swb | ch | avg | swb | s2p3 | s2p4 | avg | swb | fsh | avg |
| RNNT-C baseline | 5.3 | 8.9 | 7.1 | 5.6 | 7.1 | 10.3 | 7.7 | 9.0 | 7.1 | 8.1 |
| $p_s = p_p = 0.6, r_s = r_p$ | 5.1 | 8.5 | 6.8 | 5.4 | 6.6 | 9.8 | 7.3 | 8.2 | 6.3 | 7.3 |

The RNNT acoustic model for JPN500 can have 6 bi-directional LSTM layers (6-layer bi-directional LSTM) in the transcription network with 1,280 cells in each layer (640 cells in each direction). The prediction network can be a single-layer uni-directional LSTM with 1,024 cells. The outputs of the transcription network and the prediction network were projected down to a 256-dimensional latent space where they were combined by element-wise multiplication in the joint network. After a hyperbolic tangent nonlinearity followed by a linear transform, it can connect to a softmax layer consisting of 3547 output units corresponding to Japanese language characters and the null symbol (3546+1 symbols). The acoustic features can be 40-dimensional log-Mel features extracted every 10 ms and theirs first and second order derivatives. The logMel features were after utterance based mean normalization. Every four adjacent frames were concatenated. The more aggressive frame skipping was implemented to reduce the length mismatch between the feature sequence and character label sequence. The input (acoustic input) to the transcription network can be 480 in dimensionality (480-dim vector). The text input can be 2546 characters with a 10-dimensional embedding. Experiments based on the JPN500 dataset can suggest that the length perturbation techniques described herein can also help with ASR for different languages.

There was no data augmentation in the training, but dropout was used in the LSTM layers with a dropout rate of 0.25 and the embedding layer with a dropout rate of 0.05. Optimizer AdamW was used for the training. The learning rate can start at 0.0001 in the first epoch and then linearly scale up to 0.001 in the first 10 epochs. It can hold for another 6 epochs before being annealed by $1/\sqrt{2}$ every epoch after the 16th epoch. The model was obtained after 30 epochs (e.g., the training can end at $30^{th}$ $ epoch). The batch size can be 256 utterances. The same alignment-length synchronous decoder was used for inference (e.g., as used for the SWB300 dataset experiment). No external LM was used in decoding. Length perturbation was applied in the first 25 epochs and lifted afterwards. Various hyper-parameter configurations were evaluated for length perturbation ($p_s, p_p, r_s, r_p, T_s, T_p$) on 13 real-world test sets from a broad variety of domains and the average character error rates (CERs) across these test sets were reported.

Table 3 shows the performance of length perturbation on the JPN500 dataset using various hyper-parameter settings. Following a similar trend in SWB300, length perturbation can assist to consistently improve the CERs over the baseline. Length perturbation can reduce the CER from 19.4% in the baseline to 18.5%. It can also be observed that since a more aggressive downsampling strategy (4 frame skipping) was used for the JPN500 dataset in input feature processing compared to that of SWB300 (2 frame skipping), the optimal length perturbation setting for JPN500 can tend to favor frame insertion more than frame skipping over SWB300 (Ts=3; Tp=5 for JPN500 vs. Ts=7; Tp=3 for SWB300).

TABLE 3

Length perturbation using various hyper-parameter configurations on JPN500.

|  | CER |
| --- | --- |
| baseline | 19.4 |
| $p_p = 0.6, r_p = 0.1, T_p = 3$ | 19.0 |
| $p_p = 0.6, r_p = 0.1, T_p = 5$ | 19.2 |
| $p_p = 0.7, r_p = 0.1, T_p = 5$ | 18.7 |
| $p_s = 0.5, r_s = 0.1, T_s = 3$ | 18.5 |
| $p_s = 0.6, r_s = 0.1, T_s = 3$ | 18.7 |
| $p_s = 0.5, r_s = 0.1, T_s = 5$ | 18.7 |
| $p_s = p_p = 0.6, r_s = r_p = 0.1, T_s = 3, T_p = 3$ | 19.9 |
| $p_s = p_p = 0.6, r_s = r_p = 0.1, T_s = 3, T_p = 5$ | 18.6 |
| $p_s = p_p = 0.6, r_s = r_p = 0.2, T_s = 3, T_p = 5$ | 18.6 |

As discussed in one or more embodiments herein, length perturbation can improve the generalization of RNNT acoustic models individually and in combination with other techniques such as, for example, an n-best based label smoothing technique, wherein the n-best based label smoothing technique can comprise randomly injecting noisy labels to ground truth labels during training. The n-best based label smoothing technique (or label smoothing) can be similarly evaluated to generate comparative and complimentary results with the length perturbation technique (or length perturbation). Length perturbation was evaluated extensively on the SWB300 and JPN500 datasets and can improve accuracy over strong baselines with RNNT acoustic models. By combining the two techniques, state-of-art single-model results can be obtained on SWB300 using RNNT. In particular, the two techniques (e.g., length perturbation and label smoothing) can yield good improvements over a strong SWB300 baseline and give state-of-art performance on SWB300 using RNNT models. Length perturbation can improve the generalization of DNN acoustic modeling.

Experimental results on combining the two techniques (e.g., length perturbation and n-best based label smoothing) are reported in Table 4 wherein label smoothing was applied for up to 15 epochs and length perturbation was applied between 16 to 30 epochs. E and K represent parameters specific to label smoothing. After 30 epochs both techniques were lifted, and the training continued for another 5 epochs with the learning rates boosted by 2 times. The model used for decoding was after 35 epochs. It can be observed that the techniques (e.g., length perturbation and n-best based label smoothing) can be complementary. By combining the two techniques an average (avg.) WER of 10.7% without using the external LM and 9.2% with the external LM can be achieved. This can be described as a state-of-the-art single-model result on the Hub5 2000 test set using RNNT.

TABLE 4

Combination of length perturbation and n-best label smoothing on SWB300.

| | w/o LM | | | w/LM | | |
|---|---|---|---|---|---|---|
| | swb | ch | avg | swb | ch | avg |
| baseline | 7.4 | 15.0 | 11.2 | 6.1 | 13.5 | 9.8 |
| $\in = 0.1, K = 20, p_s = p_p = 0.5, r_s = r_p = 0.1, T_s = 5, T_p = 5$ | 6.9 | 15.0 | 11.0 | 5.8 | 13.0 | 9.4 |
| $\in = 0.1, K = 20, p_s = p_p = 0.6, r_s = r_p = 0.1, T_s = 5, T_p = 5$ | 7.0 | 14.4 | 10.7 | 5.9 | 12.7 | 9.3 |
| $\in = 0.1, K = 20, p_s = p_p = 0.5, r_s = r_p = 0.1, T_s = 7, T_p = 3$ | 6.9 | 14.5 | 10.7 | 5.9 | 12.5 | 9.2 |
| $\in = 0.1, K = 20, p_s = p_p = 0.5, r_s = r_p = 0.1, T_s = 7, T_p = 3$ | 6.8 | 14.6 | 10.7 | 5.9 | 12.7 | 9.3 |

Table 5 reports the WERs using label smoothing (nbestls), length perturbation (lenpb) and their combination on Hub5 2000, Hub5 2001 and RT03. The external LM was used in the decoding. For comparison, a reference single-model result as a baseline is presented in the $1^{st}$ row of Table 5, and the baseline used in the experiments herein are presented in the $2^{nd}$ row. The difference was the learning rate schedule and the number of epochs. With reference to the reference baseline in the $1^{st}$ row, the maximum learning rate can be set to 5e-4 and the OneCycleLR policy can be used for 20 epochs. The baseline in the $2^{nd}$ row can give slightly better performance. The models that can generate the best performance on Hub5 2000 (e.g., Tables 1 and 4), respectively, were used to evaluate on Hub5 2001 and RT03. It can be observed that, although the hyper-parameters of label smoothing and length perturbation were optimized on Hub5 2000, the models generalized well on Hub5 2001 and RT03.

TABLE 5

WERs of length perturbation and n-best label smoothing on Hub5 2000, Hub5 2001 and RT03 test sets.

| | Hub5'00 | | Hub5'01 | | | RT'03 | |
|---|---|---|---|---|---|---|---|
| | swb | ch | swb | s2p3 | s2p4 | swb | fsh |
| baseline | 6.3 | 13.1 | 7.1 | 9.4 | 13.6 | 15.4 | 9.5 |
| baseline | 6.1 | 13.5 | 6.7 | 9.6 | 13.4 | 15.7 | 9.0 |
| lenpb | 5.9 | 12.8 | 6.5 | 9.1 | 13.0 | 15.2 | 8.8 |
| nbestls | 6.0 | 13.0 | 6.6 | 9.0 | 12.7 | 14.8 | 8.8 |
| nbestls + lenpb | 5.9 | 12.5 | 6.6 | 8.7 | 12.8 | 14.0 | 8.5 |

Table 6 further shows that the two techniques (e.g., length perturbation and n-best based label smoothing) can be complementary. In the experiments, the label smoothing was applied up to 15 epochs and length perturbation can be applied between 16 to 25 epochs. After 25 epochs both techniques can be lifted, and the training can continue for another 5 epochs. The model used for decoding was after 30 epochs. The combination of the two techniques can achieve a CER of 18.4%, which can amount to 1% absolute improvement over the 19.4% baseline averaging across 13 test sets.

TABLE 6

Combination of n-best label smoothing and length perturbation on JPN500.

| | CER |
|---|---|
| baseline | 19.4 |
| $\epsilon = 0.2, K = 30, p_s = p_p = 0.5, r_s = r_p = 0.1, T_s = 3, T_p = 5$ | 18.5 |
| $\epsilon = 0.2, K = 30, p_s = p_p = 0.4, r_s = r_p = 0.1, T_s = 3, T_p = 5$ | 18.4 |
| $\epsilon = 0.2, K = 30, p_s = p_p = 0.3, r_s = r_p = 0.1, T_s = 3, T_p = 5$ | 18.7 |

Figure 3:
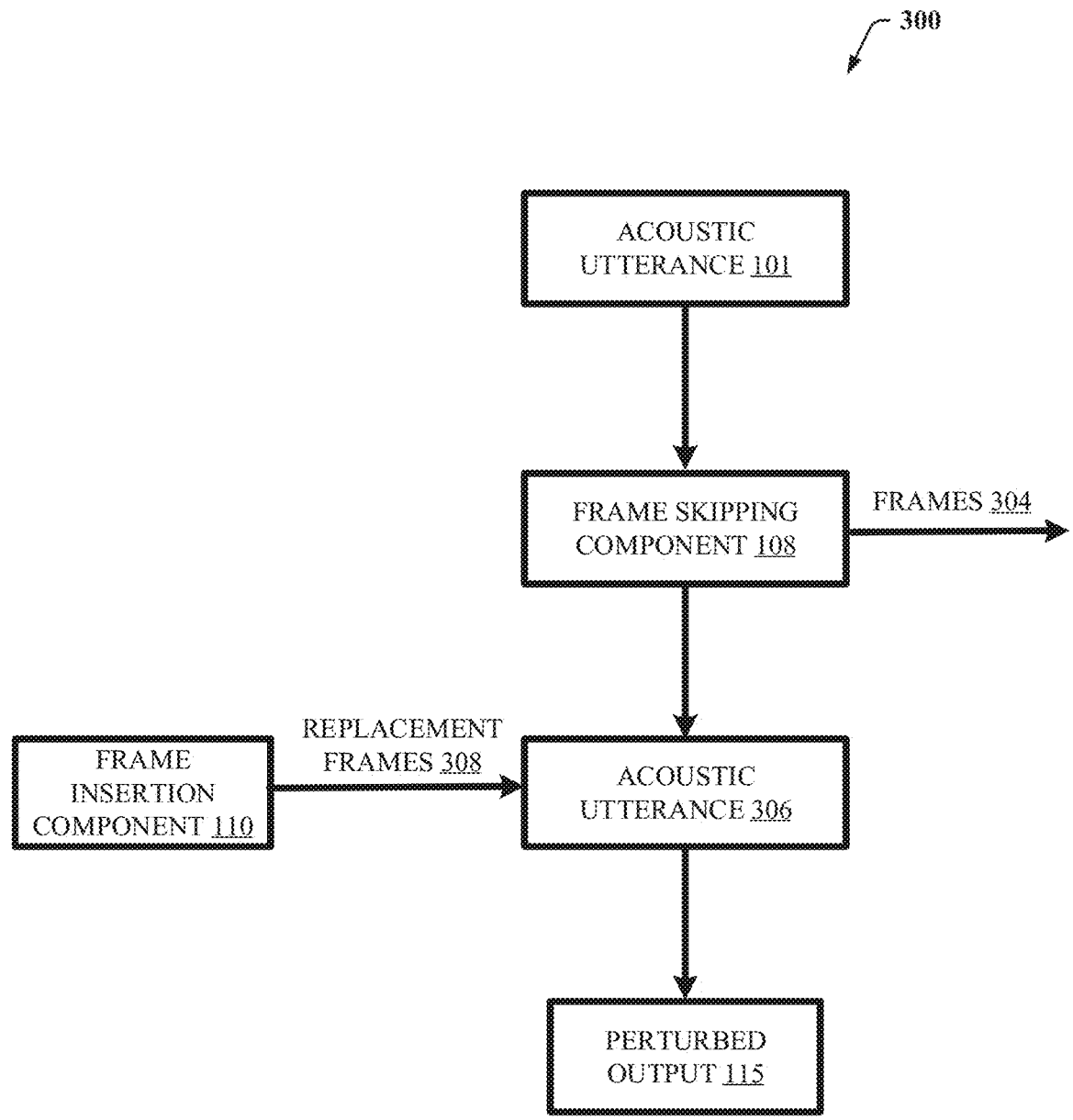
FIG. 3 illustrates a flow diagram of an example, non-limiting method for perturbing the length of an acoustic utterance in accordance with one or more embodiments described herein.

FIG. 3 illustrates a flow diagram of an example, non-limiting method 300 for perturbing the length of an acoustic utterance in accordance with one or more embodiments described herein. Repetitive description of like elements and/or processes employed in respective embodiments is omitted for sake of brevity.

As discussed in one or more embodiments, frame skipping component 108 can perturb acoustic utterance 101 by removing frames 304 to generate acoustic utterance 306. Frame insertion component 110 can insert replacement frames 308 to acoustic utterance 306 to generate perturbed output 115 wherein perturbed output 115 can be used to train an ML model such that the ML model can exhibit better generalization on real-time data. Since the length perturbation techniques discussed herein can perturb an utterance both ways, the length perturbation techniques discussed herein can comprise SpliceOut and DropFrame as special cases of one-way perturbation, which can correspond to the results in Table 1 and in Table 3 wherein only $T_s$ was used ($T_p$=0).

Length perturbation can be used by itself as shown with the JPN500 case or length perturbation can be used together with other data augmentation techniques as shown with the SWB300 case. The implementation of length perturbation can have numerous variations such as variations in the order of frame skipping and frame insertion or variations with whether frame skipping and insertion should take place in different utterances, which can be further investigated. Accordingly, the claimed subject matter is intended to embrace all such modifications and variations that fall within the spirit and scope of the appended claims.

For an exemplary input sequence, a number of locations can be randomly selected along the sequence to perturb the sequence at the randomly selected locations. Thereafter, based on certain probabilities, frame skipping and frame insertion can be applied. For example, an utterance can comprise the sentence "I go to school," and the audio can be changed to a sequence of feature vectors (e.g., speech feature sequence) representing the utterance such that the utterance can be perturbed via either frame skipping or frame utterance or via both the frame skipping and the frame utterance. For example, a speech that can be 1 second in length along a time axis can be divided into 100 frames or 100 chunks wherein each chunk can be represented by one feature vector, thereby generating a sequence of feature vectors upon which the length perturbation operations can be executed. For example, each individual chunk of the exemplary 100 chunks discussed herein can be referred to as a frame such that there can be 100 frames and the frames can be randomly dropped to perturb the sequence. Thus, an acoustic utterance (e.g., acoustic utterance 101) can be perturbed by applying the length perturbation techniques on a sequence of feature vectors (e.g., speech feature sequence) representing the acoustic utterance. Similarly, the one or more length perturbation techniques discussed herein can perturb the length of a sequence not representing an acoustic utterance. This has been described further with reference to at least FIG. 4.

Figure 4:
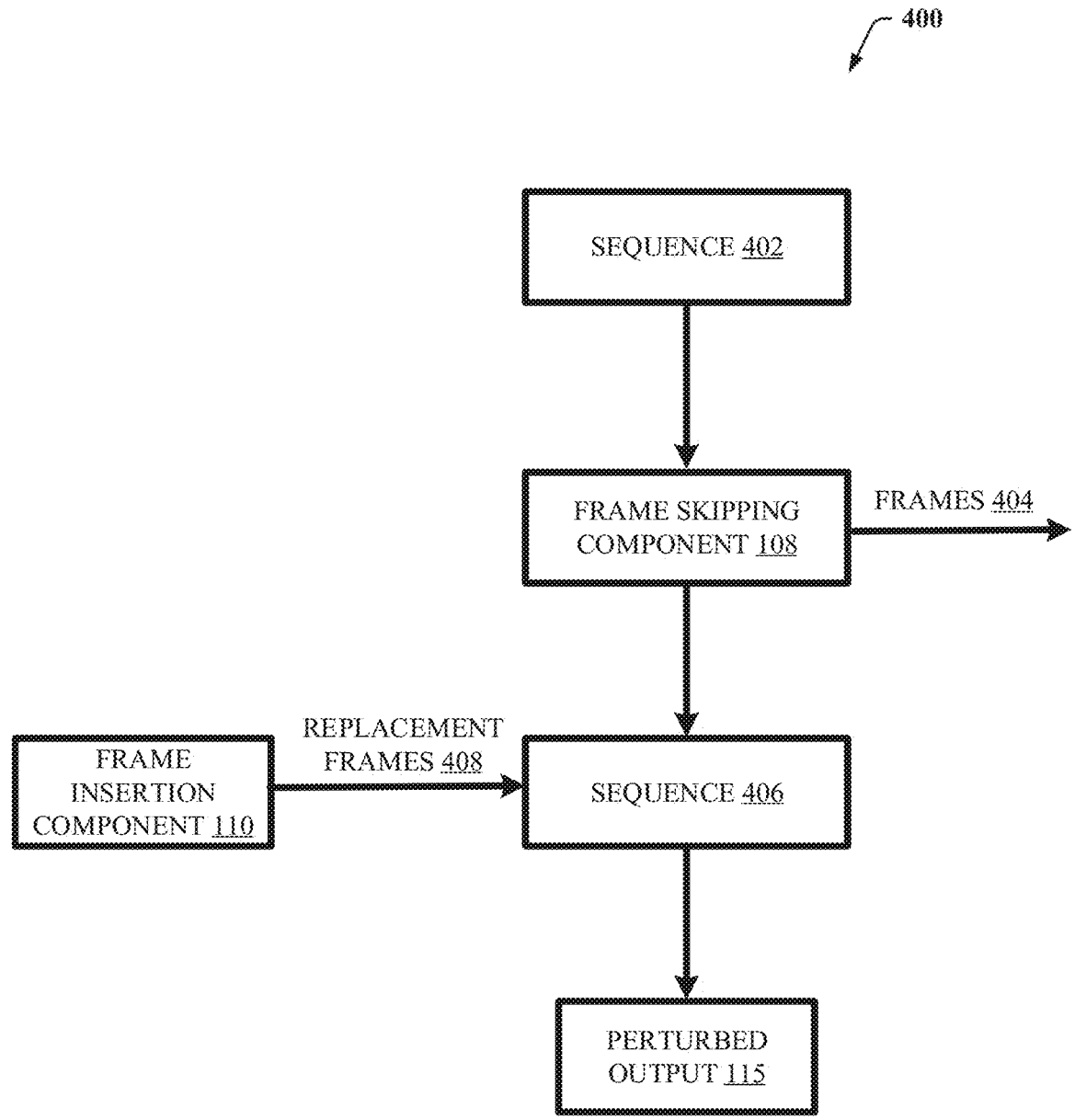
FIG. 4 illustrates a flow diagram of an example, non-limiting method for perturbing the length of a sequence in accordance with one or more embodiments described herein.

FIG. 4 illustrates a flow diagram of an example, non-limiting method for perturbing the length of a sequence in accordance with one or more embodiments described herein. Repetitive description of like elements and/or processes employed in respective embodiments is omitted for sake of brevity.

As discussed in one or more embodiments, frame skipping component 108 can perturb sequence 402 by removing frames 404 to generate sequence 406. Frame insertion component 110 can insert replacement frames 408 to sequence 406 to generate perturbed output 115 wherein perturbed output 115 can be used to train an ML model such that the ML model can exhibit better generalization on real-time data. Sequence 402 can be the sequence of an acoustic utterance or sequence 402 can be another type of sequence not associated with speech. The length perturbation techniques discussed in one or more embodiments herein can be generally applied to various sequence-to-sequence mapping techniques wherein the input and output for an ML model can be sequences, as well as to various sequence-to-one mapping techniques wherein the input for an ML model can be a sequence but the output of the ML model can be a non-sequence (e.g., image classification).

Figure 5:
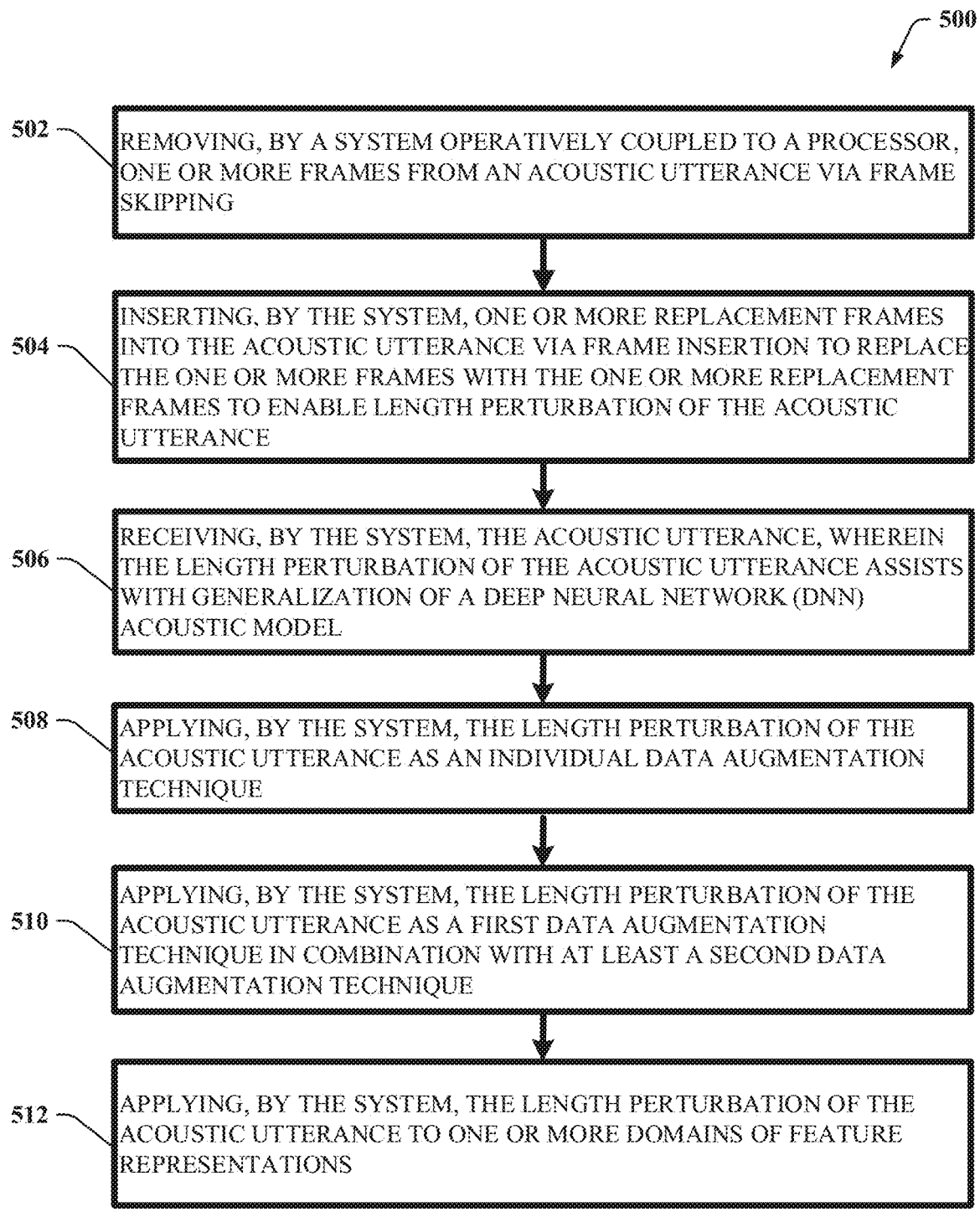
FIG. 5 illustrates a flow diagram of an example, non-limiting method for enabling length perturbation techniques for improving generalization of DNN acoustic models in accordance with one or more embodiments described herein.

FIG. 5 illustrates a flow diagram of an example, non-limiting method 500 for enabling length perturbation techniques for improving generalization of DNN acoustic models in accordance with one or more embodiments described herein. Repetitive description of like elements and/or processes employed in respective embodiments is omitted for sake of brevity.

At 502, the non-limiting method 500 can comprise removing (e.g., by frame skipping component 108), by a system operatively coupled to a processor, one or more frames from an acoustic utterance via frame skipping.

At 504, the non-limiting method 500 can comprise inserting (e.g., by frame insertion component 110), by the system, one or more replacement frames into the acoustic utterance via frame insertion to replace the one or more frames with the one or more replacement frames to enable length perturbation of the acoustic utterance.

At 506, the non-limiting method 500 can comprise receiving (e.g., by receiver component 112), by the system, the acoustic utterance, wherein the length perturbation of the acoustic utterance assists with generalization of a DNN acoustic model.

At 508, the non-limiting method 500 can comprise applying (e.g., by execution component 114), by the system, the length perturbation of the acoustic utterance as an individual data augmentation technique.

At 510, the non-limiting method 500 can comprise applying (e.g., by execution component 114), by the system, the length perturbation of the acoustic utterance as a first data augmentation technique in combination with at least a second data augmentation technique.

At 512, the non-limiting method 500 can comprise applying (e.g., by execution component 114), by the system, the length perturbation of the acoustic utterance to one or more domains of feature representations.

Figure 6:
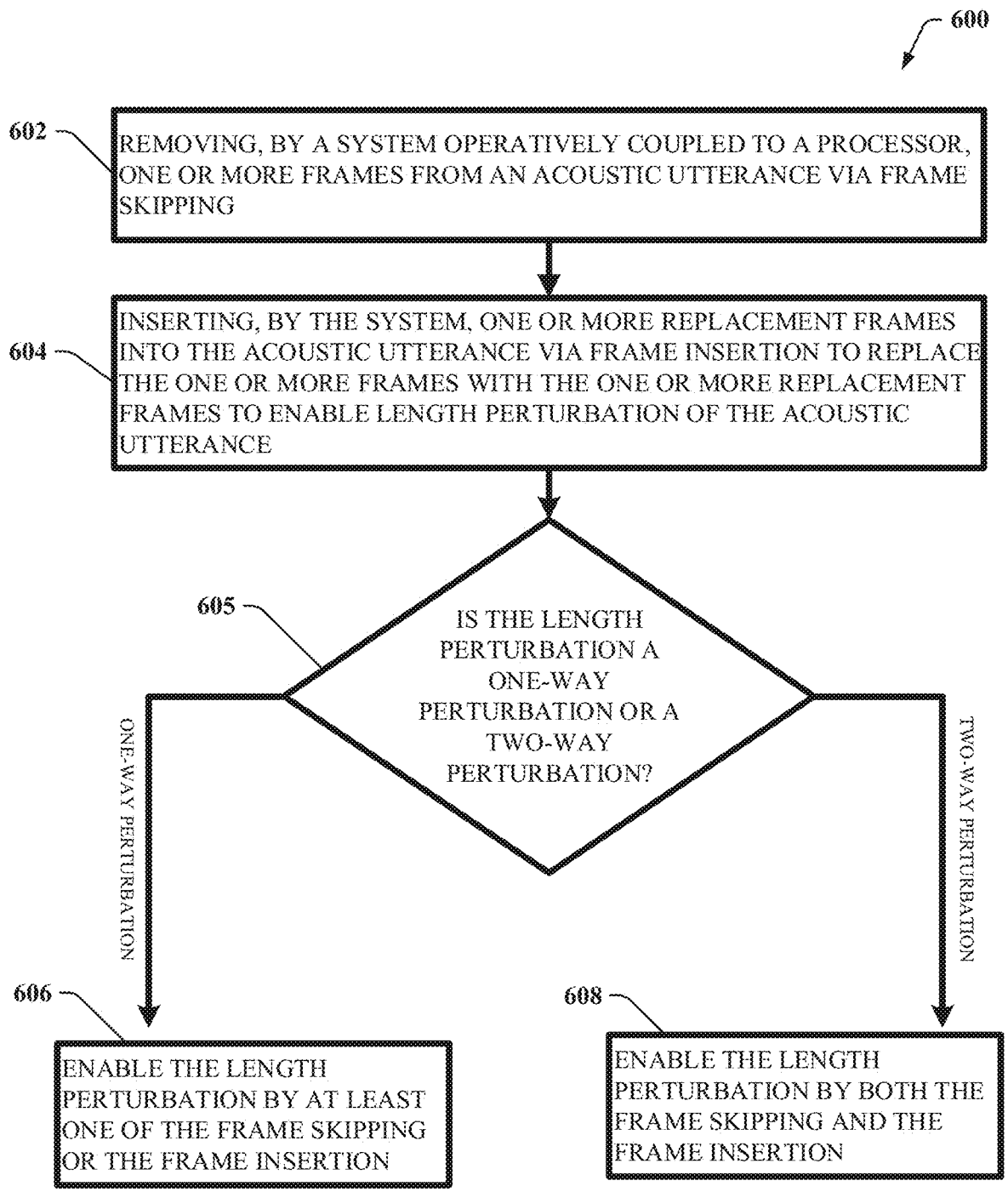
FIG. 6 illustrates another flow diagram of an example, non-limiting method for enabling length perturbation techniques for improving generalization of DNN acoustic models in accordance with one or more embodiments described herein.

FIG. 6 illustrates another flow diagram of an example, non-limiting method 600 for enabling length perturbation techniques for improving generalization of DNN acoustic models in accordance with one or more embodiments described herein. Repetitive description of like elements and/or processes employed in respective embodiments is omitted for sake of brevity.

At 602, the non-limiting method 600 can comprise removing (e.g., by frame skipping component 108), by a system operatively coupled to a processor, one or more frames from an acoustic utterance via frame skipping.

At 604, the non-limiting method 600 can comprise inserting (e.g., by frame insertion component 110), by the system, one or more replacement frames into the acoustic utterance via frame insertion to replace the one or more frames with the one or more replacement frames to enable length perturbation of the acoustic utterance.

At 605, the non-limiting method 600 can determine if the length perturbation is to be applied as a one-way perturbation or a two-way perturbation. If the length perturbation is to be applied as a one-way perturbation, the non-limiting method 600 can enable, at 606, the length perturbation by at least one of the frame skipping or the frame insertion. If the length perturbation is to be applied as a two-way perturbation, the non-limiting method 600 can enable, at 608, the length perturbation by both the frame skipping and the frame insertion.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively perturb the length of an acoustic utterance or another sequence as the one or more embodiments described herein can enable this process. And, neither can the human mind nor a human with pen and paper perturb the length of an acoustic utterance or another sequence, as conducted by one or more embodiments described herein.

Figure 7:
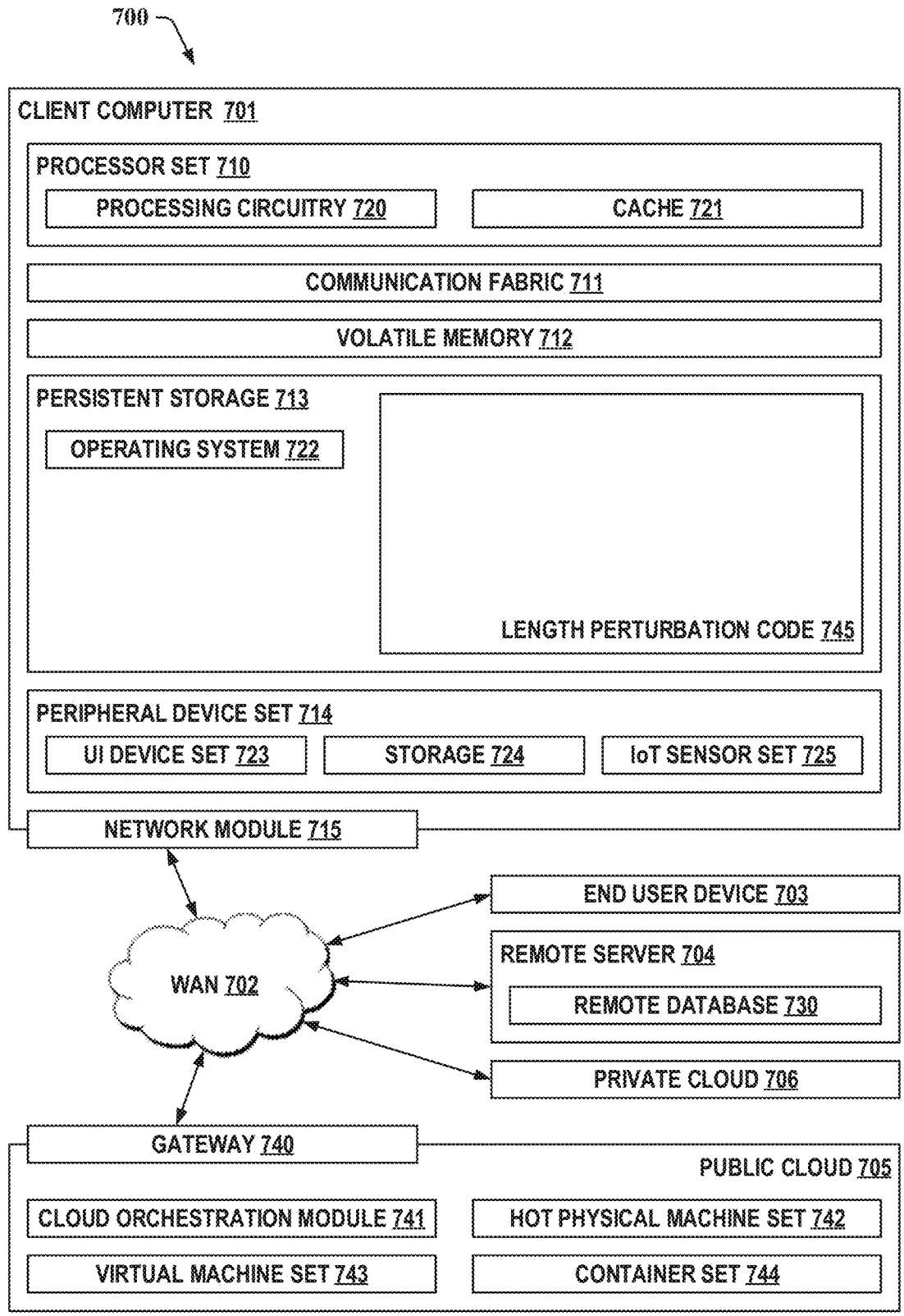
FIG. 7 illustrates a block diagram of an example, non-limiting operating environment in which one or more embodiments described herein can be facilitated.

FIG. 7 illustrates a block diagram of an example, non-limiting operating environment 700 in which one or more embodiments described herein can be facilitated. FIG. 7 and the following discussion are intended to provide a general description of a suitable operating environment 700 in which one or more embodiments described herein at FIGS. 1-6 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as length perturbation code 745. In addition to block 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 745, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 1720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 745 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," "data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented system, comprising:
    a memory that stores computer executable components; and
    a processor that executes at least one of the computer executable components that:
        performs length perturbation of an acoustic utterance comprising a group of frames in a sequence, wherein the performing the length perturbation comprises:
            random sampling a first defined percentage of frames from the group of frames resulting in a first subset of drop frames;
            for each drop frame, removing a first defined quantity of consecutive frames from the group of frames starting with the drop frame;
            random sampling a second defined percentage of frames from the group of frames resulting in a second subset of insert frames; and
            for each insert frame, inserting a second defined quantity of replacement frames into the acoustic utterance after the insert frame.

2. The computer-implemented system of claim 1, wherein the at least one of the computer executable components further:
    receives the acoustic utterance from a speech recognition system.

3. The computer-implemented system of claim 1, wherein the length perturbation of the acoustic utterance assists with generalization of a deep neural network (DNN) acoustic model.

4. The computer-implemented system of claim 1, wherein the length perturbation of the acoustic utterance is a one-way perturbation enabled by at least one of the removing the first defined quantity of consecutive frames or the inserting of the second defined quantity of replacement frames.

5. The computer-implemented system of claim 1, wherein the length perturbation of the acoustic utterance is a two-way perturbation enabled by both the removing the first defined quantity of consecutive frames and the frame inserting of the second defined quantity of replacement frames.

6. The computer-implemented system of claim 1, wherein at least one of the computer executable components applies the length perturbation of the acoustic utterance as individual data augmentation technique.

7. The computer-implemented system of claim 1, wherein at least one of the computer executable components applies the length perturbation of the acoustic utterance as a first data augmentation technique in combination with at least a second data augmentation technique that is different from the length perturbation.

8. The computer-implemented system of claim 1, wherein the length perturbation of the acoustic utterance is applied to one or more domains of feature representations of the acoustic utterance.

9. The computer-implemented system of claim 1, wherein the the removing the first defined quantity of consecutive frames and the frame inserting of the second defined quantity of replacement frames are applied towards the length perturbation using one or more sequence-to-sequence models, to assist with generalization of the one or more sequence-to-sequence models.

10. The computer-implemented system of claim 1, wherein the the removing the first defined quantity of consecutive frames and the frame inserting of the second defined quantity of replacement frames are applied towards the length perturbation using one or more sequence-to-one models, to assist with generalization of the one or more sequence-to-one models.

11. A computer-implemented method, comprising:
    performing, by a system operatively coupled to a processor, length perturbation of an acoustic utterance comprising a group of frames in a sequence, wherein the performing the length perturbation comprises:
        random sampling a first defined percentage of frames from the group of frames resulting in a first subset of drop frames;
        for each drop frame, removing a first defined quantity of consecutive frames from the group of frames starting with the drop frame;

random sampling a second defined percentage of frames from the group of frames resulting in a second subset of insert frames; and for each insert frame, inserting a second defined quantity of replacement frames into the acoustic utterance after the insert frame.

12. The computer-implemented method of claim 11, further comprising:

receiving, by the system, the acoustic utterance from a speech recognition system.

13. The computer-implemented method of claim 11, wherein the length perturbation of the acoustic utterance assists with generalization of a DNN acoustic model.

14. The computer-implemented method of claim 11, wherein the length perturbation of the acoustic utterance is a one-way perturbation enabled by at least one of the removing the first defined quantity of consecutive frames or the inserting of the second defined quantity of replacement frames.

15. The computer-implemented method of claim 11, wherein the length perturbation of the acoustic utterance is a two-way perturbation enabled by both the removing the first defined quantity of consecutive frames and the frame inserting of the second defined quantity of replacement frames.

16. The computer-implemented method of claim 11, further comprising:

applying, by the system, the length perturbation of the acoustic utterance as an individual data augmentation technique.

17. The computer-implemented method of claim 11, further comprising:

applying, by the system, the length perturbation of the acoustic utterance as a first data augmentation technique in combination with at least a second data augmentation technique that is different from the length perturbation.

18. The computer-implemented method of claim 11, further comprising:

applying, by the system, the length perturbation of the acoustic utterance to one or more domains of feature representations of the acoustic utterance.

19. A computer program product for improving generalization of a DNN acoustic model, the computer program product comprising a non-transitory computer readable medium having program instructions embodied therewith, the program instructions executable by a processor to cause the processor to:

performing, by the processor, length perturbation of an acoustic utterance comprising a group of frames in a sequence, wherein the performing the length perturbation comprises:

random sampling a first defined percentage of frames from the group of frames resulting in a first subset of drop frames;

for each drop frame, removing a first defined quantity of consecutive frames from the group of frames starting with the drop frame;

random sampling a second defined percentage of frames from the group of frames resulting in a second subset of insert frames; and for each insert frame, inserting a second defined quantity of replacement frames into the acoustic utterance after the insert frame.

20. The computer program product of claim 19, wherein the program instructions are further executable by the processor to cause the processor to:

receive, by the processor, the acoustic utterance from a speech recognition system.

* * * * *